July 20, 1937. J. Q. SHERMAN Re. 20,452

MANIFOLDING PAPER

Original Filed July 18, 1932

INVENTOR

BY John Q. Sherman

Wilkes & Dybing

ATTORNEY

Reissued July 20, 1937 Re. 20,452

UNITED STATES PATENT OFFICE 20,452

MANIFOLDING PAPER

John Q. Sherman, Dayton, Ohio

Original No. 1,897,013, dated February 7, 1933, Serial No. 623,118, July 18, 1932. Application for reissue December 18, 1936, Serial No. 116,654

19 Claims. (Cl. 282—12)

Figure 1:
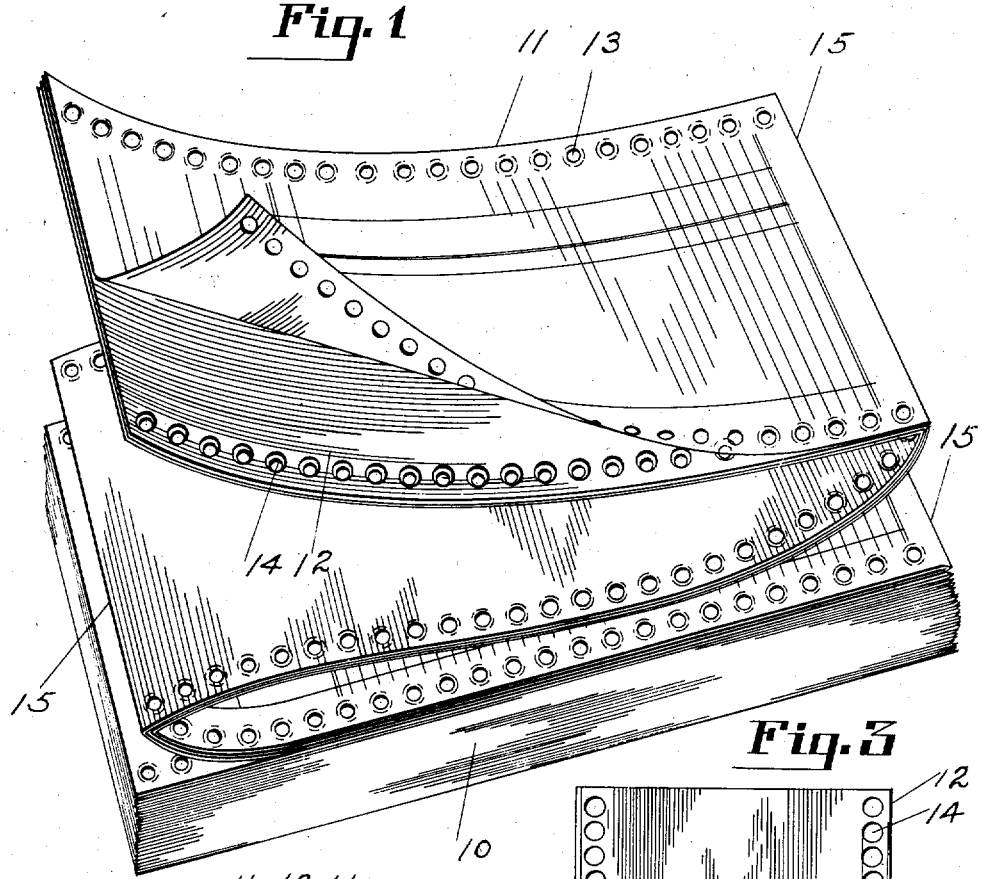

This invention relates to manifolding systems employing superposed record strips and interleaved strips of transfer material, particularly to continuous webs of material having over and underlying printed forms to be registered with each other and which are interleaved with continuous webs of "one time" carbon material, the manifolding assembly being punched at spaced intervals for engagement with the feeding pins of pin type aligning platens or other pin wheel feeding devices, in the present instance the apertures of certain webs being enlarged to afford increased clearance.

Due to atmospheric conditions, unequal expansion and contraction of different strips, variance of the quality of material of different colors, weight and gauge, and mechanical difficulties of commercial duplication, the supply portions of the assembly of strips do not always accurately register and the feeding holes of over and underlying strips are not always concentric. This condition is further aggravated by the superfolding of the strips into flat packets of zigzag formation wherein the forms and holes of succeeding strips are forced out of registry by successive enclosing folds of material.

Accurate registry of the printed forms of superposed strips at the writing position is effected and maintained by relative shifting adjustment of the strips as the feeding pins progressively enter the succeeding punched holes which initially may be slightly out of registry but which are concentrically positioned by the action of the feeding pins in entering the overlapping holes.

The carbon material usually employed, being intended to be used but once and then discarded, is ordinarily quite flimsy and lacking in tensile strength. Furthermore, the carbon coating material renders the interleaved transfer strips somewhat tenacious or in some cases "tacky" causing them to adhere to the underlying record strips and retards the slipping action necessary for proper relative adjustment to bring punched holes therein into registry with those of the record strips.

In the past, inaccuracies in manufacture have often made necessary the manufacture of continuous length superfolded forms and transfer material wherein the transfer material was narrower than the record strips so as not to engage the feed pins, where the pin feed device was used, and it was therefore necessary to spot glue the transfer material to the record strip at intervals to keep it from shifting laterally and to cause it to feed along with the record material.

Heretofore, when a punched transfer material was employed, it has been customary to make the feeding holes in the transfer material and those in the record strips of the same size. This necessitates a shift of the transfer material relative to the record strips in order that initially overlapping feeding holes in the respective strips may be concentrically disposed by the entering action of the feeding pins.

Due to the flimsy character of the commercial "one time" carbon material, it does not possess the strength of resistance necessary to overcome resistance to slipping adjustment afforded by its tenacious surface, and such carbon material is subject to frequent mutilation and tearing adjacent the feeding holes by the action of the pin aligning devices, particularly where a great many copies are manifolded in a set as are frequently required.

The maximum deflection of the printed forms and feeding holes of different superposed strips out of registry due to reverse or zigzag collective folding of the assembly of strips usually does not greatly exceed one-sixteenth to three-thirty-seconds of an inch in the production of commercial manifolding material. However, this may vary through greater or less range under different circumstances and conditions, different thickness of material, and due to other factors. The offsetting of forms and feed holes due to superfolding or zigzag formation of the strips tends to correct itself at each reversal of the direction of folding, so that this discrepancy does not usually become cumulative. However, error due to manufacturing or mechanical inaccuracy and also the discrepancy arising from atmospheric conditions and unequal expansion and contraction, while perhaps of not greater degree in any specific instance, is cumulative forwardly or rearwardly throughout the length of the strip and the offsetting forms and holes gradually increases.

In the present construction, the problem of feeding the interposed transfer material in unison with the record material without mutilation, is solved and the difficulties arising from superfolding, inaccuracies of manufacture, and unequal expansion are overcome by the simple but effective method of providing sufficient clearance or tolerance in the size of the holes in the transfer material that an overlapping condition of unpunched portions of the transfer strips with punched holes in the record material cannot ordinarily occur within the usual range of deflection or displacement of the strips, especially when caused by variance of the spacing of successive folds or inaccuracy in the relation of the punched feeding holes to the folds of the carbon sheets in their relation to the printed forms.

To this end, therefore, two different sizes of over and underlying holes are provided in the transfer and record material respectively in the same longitudinal succession of feeding holes. The record material is provided with holes of proper size to receive the feeding pins and effect accurate registry of the printed forms of the record strips by effecting concentric disposition of the feeding holes which are located in definite relation to the printed forms. The transfer material is provided with feeding holes of larger size than those of the record material and capable of assuming various eccentric positions relative to the feeding pins and corresponding holes in the record material so that the record material feed holes will fall within the areas of the transfer material feed holes even though there may be definite and decided relative displacement of over and underlying transfer and record material. The larger holes in the carbon material not only prevent overlapping of the transfer material over the feeding holes in the record strips and clear the feeding pins because of the restricted displacement controlled by the folds, thus avoiding interference with the entry of the pins into the holes in the record material, but they also prevent the transfer material from lagging behind the record material and insure unison advancement by engaging the front margins of the enlarged holes with the feeding pins in those instances in which the adherence of the transfer material to the record material is insufficient to transmit feeding movement.

While the invention is applicable to a wide variety of manifolding material for use in different styles of pin feed writing machines, billing machines, autographic registers, and typewriters, it is especially desirable for series connected stationery and printed forms wherein both the record and transfer material is transversely scored at spaced intervals for detachment of successive inscribed portions, the supply portions of which may be provided in roll form, but which assembly is preferably reversely folded to and fro into zigzag formation.

The object of the invention is to provide a manifolding assembly of alternating record and transfer material which will not only be cheap in production, but which may be uniformly fed through any standard type of pin feed writing machine without mutilation or tearing of the transfer material while achieving and maintaining registry of the superposed strips of record material at the writing position.

A further object of the invention is to provide means for automatically compensating for unequal expansion and contraction of different portions of a manifolding assembly.

A further object of the invention is to provide means for automatically compensating for inequalities and inaccuracy of manufacture of punched transfer material for use on pin feed typewriting machines.

A further object of the invention is to provide transfer material which will be positively advanced in unison with over and underlying portions of material, but which will be permitted a limited range of independent adjustment relative thereto.

A further object of the invention is to provide means by which a limited range of lateral deflection of interposed portions of transfer material may be permitted relative to over and underlying portions of record material without affecting the feeding movement of the latter or causing mutilation of the transfer material.

A further object of the invention is to permit limited longitudinal relative adjustment of portions of transfer material and over and underlying portions of record material, while insuring continued advance movement of both materials.

A further and important object of the invention is to enable the feeding of an increased number of superposed portions of record material through a pin feed type of writing machine.

With the above primary and other incidental objects in view, as will more fully appear in the specification, the invention consists of the features of construction, the parts and combinations thereof, and the mode of operation, or their equivalents, as hereinafter described and set forth in the claims.

Figure 3:
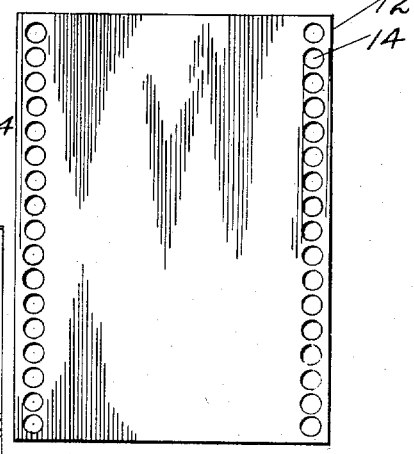
Figure 8:
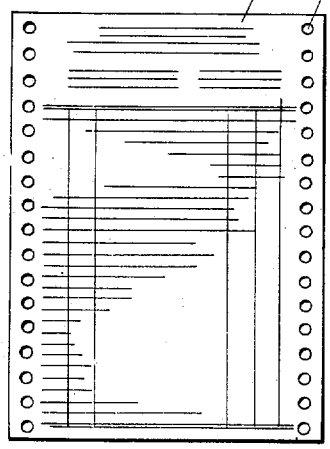
Figure 4:
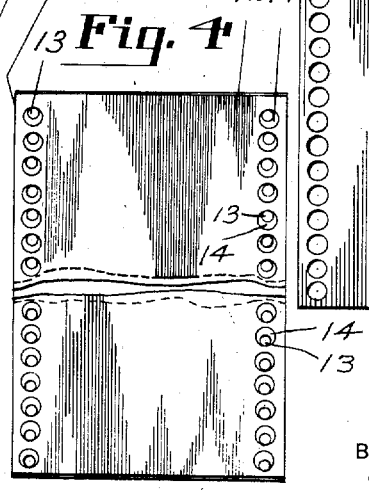

Referring to the accompanying drawing wherein is shown the preferred, but obviously not necessarily the only form of embodiment of the invention, Fig. 1 is a perspective view of manifolding material superfolded into zigzag formation and embodying the present invention of large holes in the interleaved transfer material and holes of smaller size in the over and underlying record material. Fig. 2 is a plan view of a portion of the record material showing feeding holes of smaller size suitable for reception of the feeding pins of a pin type feeding device, by which the holes in superposed portions of record material are brought into concentric relation with each other thereby insuring accurate registry of printed forms upon such record material. Fig. 3 is a similar plan view of a portion of transfer material having therein enlarged feeding holes for conjoint use with the feeding holes in the record material, but which are sufficiently larger to permit a limited range of relative adjustment. Fig. 4 is a plan view of a portion of transfer material superposed upon a portion of record material showing the relative relation of the feeding holes in the respective materials, such holes being shown in different relative positions in different portions of the superposed sheets.

Like parts are indicated by similar characters of reference throughout the several views.

In the drawing, 10 indicates a packet of collectively folded manifolding material comprising superposed record strips 11 and interleaved strips of transfer or carbon material 12. The record strips 11 ordinarily bear printed forms which are to be accurately registered with each other at the writing position in order to insure duplication of the inscribed material in proper relation to the printed items on the underlying forms. Such transfer of the written matter is effected by the interleaved carbon material 12 which, for general commercial use, is preferably, though not necessarily, of the "one time" character. It has been determined for commercial usage that the time of the operator in interleaving and removing carbon sheets from between the record material is more valuable than the transfer material itself and hence, at the present time, there is extensively employed carbon or transfer material of such inexpensive character that it may be economically discarded after having been once used. Quite naturally such cheap, "one time" carbon or transfer material is quite flimsy in character and lacking in tensile strength and hence easily torn or mutilated. As has been before mentioned, it has heretofore been the usual and customary practice to provide in both the record material and in the interleaved carbon or transfer material marginally punched feeding holes to receive aligning and feeding pins of a pin type platen roll or pin wheel feed device of a writing machine.

Heretofore the holes in the record material and those in the interleaved carbon or transfer material have been usually made of equal size. However, due to atmospheric conditions and consequent unequal expansion and contraction or to inaccuracies of manufacture, the holes in the respective record and transfer materials have not always been in accurate registry, but the transfer material adjacent the holes sometimes overlaps the hole in the record material, and the transfer material not being freely shiftable between the record sheets or strips due to its tenacious surface coating, the transfer material was frequently torn or mutilated by the entering feeding pins.

While as before stated, the interfolding of superposed strips greatly aggravates the displacement of the holes of different strips of both record and transfer material out of registry due to the fold of each succeeding strip enclosing the fold of other strips and hence each enclosing folded portion is slightly offset, such interfolding also performs a beneficial function in preventing greater relative displacement of the several strips confining the relative displacement thereof to such limit that it may be compensated by differentiation of size of the feed holes in different strips.

Automatic readjustment being thus prevented, the accumulated discrepancies may cause the entire assembly to be displaced from the feeding pins.

To overcome such difficulty in the present construction, the feeding holes 13 in the record strips 11 are slightly larger than the size of the feeding pins and are brought into substantially concentric relation by the entrance of the feeding pins progressively into the overlying holes of superposed materials. This insures accurate registry of the printed forms. However, it is not essential that the interleaved portion of transfer material shall be in a definite registering position, and to avoid interference with overlapping portions of the transfer material and their consequent mutilation, the feeding holes 14 of the interposed transfer material portion 12 are made of somewhat greater size than the holes 13 of the record material and the diameter of the pins engageable therein. The difference in the relative size of the holes 13 and 14 is quite apparent in Fig. 1 where the holes are shown concentrically disposed, the larger holes in the underlying transfer material being indicated by dotted lines concentric with the circles indicating the holes 13 in the record material. Likewise in Fig. 4, the relative size of the holes in the record and transfer material is shown. In the upper portion of Fig. 4, the relation of the holes is such that when both the record and transfer materials are being advanced in unison by the engagement of the feeding pins with the forward margins of the holes 13 and 14, the increased size of the holes 14 enables a limited degree of adjustment of the transfer material both laterally and longitudinally independently of the record material and the feeding pins protruding through both the holes 13 and 14.

When the assembly of alternating record and transfer material, shown in Fig. 1, is fed through a writing machine having pin feeding and aligning devices, the engagement of the feeding pins in the holes 13 relatively adjusts the superposed portions of record material and maintains them in accurate registry at the writing position. At the same time the interleaved transfer material 12 which is subject to expansion and contraction to far greater degree than the record material, may do so without interfering with the operation of the pin type feeding mechanism. The increased dimensions of the apertures 14 in the transfer material permit such material to shrink or expand either longitudinally or laterally, or to shift its position within limited range. The feeding pins engage the forward margins of the enlarged apertures 14 to advance the transfer material in unison with the advancement of the record material, but the enlargement of the holes 14 permits a certain degree of variation not permissible when the holes of the transfer and record material are of substantially equal size. The present method enables the transfer material to be punched and transversely scored apart from the punching and scoring of the record material either at different times or on different machines, whereas heretofore when the transfer and record material were necessarily accurately registered with each other, due to the necessity for concentric disposition of the feed holes in both materials, it has been the practice to punch and score the transfer material on the same machine and at the same time with the record material. Furthermore, it enables the transfer material to be punched and scored in superposed strips simultaneously with each other but independently of the record material, since such great degree of accuracy in relative spacing of the apertures 14 is not so essential as the spacing of the apertures 13.

After being punched and scored, the strips of record and transfer material are brought together and interfolded, or assembled in any suitable relation. These various operations may be performed by comparatively inexpensive automatic machines and without attention of skilled labor, which materially decreases the cost of production and increases the efficiency of the material and its usefulness in writing machines.

While for illustrative purposes the larger holes 13 are illustrated in the drawing as found in the transfer strips, it is quite obvious that such relation of the larger and smaller holes might be reversed and also that such enlarged holes may be provided in some of the record strips, while other strips of the same assembly may have smaller holes when conditions of use or the character of the material employed indicate the desirability of such adaptation. This provision of enlarged feeding holes in record strips is advantageous when tissue or exceedingly light weight material is employed for record strips or when such strips lack the necessary tensile strength.

Although the modification disclosed shows marginally punctured holes, any removed portions or cut outs within the longitudinal marginal edges of the strip for individual accommodation of strip feeding means such as notched margins or a margin having projections arranged for engagement by the feeding devices are deemed within the scope of this invention, but not including manifolding assemblies wherein the carbon strip is uninterrupted by holes or cut outs and the width thereof is equal to or less than the transverse distance between the inner margins of opposite feed holes of the accompanying record strip.

From the above description it will be apparent that there is thus provided an assembly of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise the preferred form of several modes of putting the invention into effect, and the invention is therefore claimed in any of its forms or modifications within the legitimate and valid scope of the appended claims.

Having thus described my invention, I claim:

1. In a manifolding assembly for use with a machine having sheet feeding devices, record sheets having punched holes for simultaneous engagement with the sheet feeding devices and an interposed sheet of transfer material having corresponding punched holes of larger size than those of the record sheets and through which holes the sheet feeding devices are received.

2. In a manifolding assembly, alternating sheets of record and transfer material marginally punched for simultaneous engagement with pin type feeding devices, the punched apertures of the transfer material being of larger size than those of the record material the apertures of the transfer and record material being relatively overlapped for simultaneous engagement by feeding pins.

3. In a manifolding assembly, alternating sheets of record and transfer material having punchings of different size for simultaneous engagement with a pin type feeding device, the punchings of the transfer material being extended beyond the margins of the punchings of the record material.

4. In a manifolding assembly, alternating sheets of record and transfer material adapted for simultaneous engagement with sheet feeding mechanism, there being clearance provided within the longitudinal marginal edges of the transfer material at the point of engagement whereby the transfer material is free for limited shifting movement relative to the feeding mechanism to greater extent than the record material.

5. Manifolding material including an apertured record sheet and an apertured sheet of transfer material, the apertures of the respective sheets being of different size and located in overlapping relation with each other.

6. In a manifolding assembly for use with a machine having pin type feeding devices, superposed continuous record strips having marginal spaced apertures for simultaneous engagement with the pin type feeding devices, and an interposed continuous strip of transfer material having marginal spaced apertures of larger size than those of the record strips through which the pins of a pin type feeding device are received into engagement within the apertures of the record strips.

7. In a manifolding assembly, continuous length alternating strips of record and transfer material having in different strips cutout areas disposed in overlapping relation to receive pin type feeding devices projecting simultaneously through the various strips, the cutout areas of the transfer material being of greater extent than those of the record material.

8. In a manifolding assembly, continuous lengths of record and transfer material arranged in superposed alternating relation and simultaneously engageable with feeding devices therefor, and cut-out areas of different extent formed in different lengths of material of the assembly whereby such different members are relatively movable to different degree while maintaining operative relation with the feeding devices.

9. In a manifolding assembly, continuous lengths of record material having a succession of spaced cutouts for engagement with a pin type feeding device, and a continuous length of transfer material also having a succession of cutouts for simultaneous engagement with the same pin type feeding device, the cutouts of the respective record and transfer materials being of different sizes and disposed in overlapping relation.

10. Manifolding material including continuous lengths of apertured record and apertured transfer material subject to the action of a common feeding device engageable within the apertures of the respective materials, the apertures of different lengths of material being of different size whereby they are capable of differential adjustment independently of the common feeding device.

11. In a manifolding assembly, continuous lengths of reversely folded superposed record material having portions removed for simultaneous engagement with sheet feeding edvices, and an interposed continuous length of transfer material having portions removed in overlapping relation with and of larger size than those of the record material for simultaneous reception of feeding devices common thereto.

12. In a manifolding assembly, continuous lengths of reversely interfolded alternating portions of record and transfer material punched with holes of different size for simultaneous engagement with a pin type feeding device, the punchings of the transfer material being extended beyond the margins of the punchings of the record material.

13. Manifolding material including continuous lengths of record material and a corresponding continuous length of transfer material, longitudinally spaced portions of material throughout overlapping areas of different extent being removed from the bodies of the respective lengths of record and transfer material, said record material and transfer material being superposed in manifold relationship with each other and having transversely scored lines at established intervals for easy division.

14. Continuous lengths of manifolding material, including apertured record material and apertured transfer material to be simultaneously engaged by a feeding means engageable within the apertures of the respective record and transfer materials, the apertures of the respective materials being of different size, whereby the record and transfer materials are capable of limited relative adjustment while sheet feeding means engage in said apertures, said manifolding material being transversely scored at intervals and folded at the scored lines.

15. Continuous manifolding material, including alternating portions of record material and transfer material, longitudinally spaced portions of material throughout overlapping areas of different extent being removed from the respective record and transfer materials to enable engagement with material feeding means.

16. Continuous manifolding material, including superposed portions of record material and transfer material, the record and transfer materials having cutouts of different size located inwardly from the longitudinal marginal edges thereof and normally positioned to overlap each other, said cutouts being adapted for reception of pin wheel feeding devices.

17. In a manifolding assembly for use in a machine having strip feeding devices, a plurality of superposed strips marginally punched for simultaneous engagement with pin type feeding devices, different strips of the plurality having holes therein of different sizes disposed in overlapping relation.

18. In a manifolding assembly for use in a machine having strip feeding devices, a plurality of superposed strips, different strips of the plurality having therein overlapping cutouts of different extent for engagement therein of strip feeding devices.

19. In a manifolding assembly a plurality of superposed sheets of material adapted for simultaneous engagement with sheet feeding mechanism, there being a clearance provided within the longitudinal marginal edges of the sheets at the point of engagement whereby at least one of the sheets is free for limited shifting movement relative to the feeding mechanism to a greater extent than another sheet of the assembly.

JOHN Q. SHERMAN.